United States Patent
Lu et al.

(10) Patent No.: US 9,426,279 B2
(45) Date of Patent: *Aug. 23, 2016

(54) SYSTEMS AND METHODS FOR ECHO CANCELLATION AND ECHO SUPPRESSION

(71) Applicant: CONEXANT SYSTEMS, INC., Irvine, CA (US)

(72) Inventors: Youhong Lu, Irvine, CA (US); Trausti Thormundsson, Irvine, CA (US); Yair Kerner, Kiryat Ono (IL); Ragnar H. Jonsson, Laguna Niguel, CA (US)

(73) Assignee: CONEXANT SYSTEMS, INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/160,467

(22) Filed: Jan. 21, 2014

(65) Prior Publication Data

US 2014/0133649 A1 May 15, 2014

Related U.S. Application Data

(63) Continuation of application No. 12/684,829, filed on Jan. 8, 2010, now Pat. No. 8,634,569.

(51) Int. Cl.
*H04M 9/08* (2006.01)
*H04M 3/00* (2006.01)

(52) U.S. Cl.
CPC ............. *H04M 3/002* (2013.01); *H04M 9/082* (2013.01)

(58) Field of Classification Search
CPC .................................................. H04M 9/082
USPC ...................... 379/406.01–406.16
See application file for complete search history.

(56) References Cited

U.S. PATENT DOCUMENTS

| | | | | |
|---|---|---|---|---|
| 5,680,450 | A * | 10/1997 | Dent ................... | H04M 9/082 379/388.02 |
| 6,301,357 | B1 * | 10/2001 | Romesburg ............ | H04M 9/08 379/406.01 |
| 6,434,110 | B1 * | 8/2002 | Hemkumar ........... | H04M 9/082 370/201 |
| 6,570,985 | B1 * | 5/2003 | Romesburg ............ | H04B 3/23 379/390.02 |
| 7,359,522 | B2 | 4/2008 | Aarts et al. | |
| 7,403,609 | B2 | 7/2008 | Hirai et al. | |
| 7,660,425 | B1 | 2/2010 | Reed et al. | |

(Continued)

FOREIGN PATENT DOCUMENTS

EP  1848243 A1  10/2007

OTHER PUBLICATIONS

Benesty, Jacob, et al; A Better Understanding and an Improved Solution to the Specific Problems of Stereophonic Acoustic Echo Cancellation; IEEE Transactions on Speech and Audio Processing, vol. 6, No. 2, Mar. 1998, pp. 156-165.

(Continued)

*Primary Examiner* — Solomon Bezuayehu
(74) *Attorney, Agent, or Firm* — Haynes and Boone, LLP

(57) ABSTRACT

Traditionally, echo cancellation has employed linear adaptive filters to cancel echoes in a two way communication system. The rate of adaptation is often dynamic and varies over time. Disclosed are novel rates of adaptation that perform well in the presence of background noise, during double talk and with echo path changes. Additionally, the echo or residual echo can further be suppressed with non-linear processing performed using joint frequency-time domain processing.

13 Claims, 10 Drawing Sheets

(56) References Cited

U.S. PATENT DOCUMENTS

| | | | |
|---|---|---|---|
| 7,925,007 B2 | 4/2011 | Stokes, III et al. | |
| 2002/0159585 A1* | 10/2002 | Janse | H04M 9/082 |
| | | | 379/406.01 |
| 2004/0086109 A1 | 5/2004 | Takada | |
| 2005/0063536 A1* | 3/2005 | Myllyla | H04M 9/082 |
| | | | 379/406.08 |
| 2006/0002547 A1 | 1/2006 | Stokes et al. | |
| 2006/0251261 A1* | 11/2006 | Christoph | H03G 3/32 |
| | | | 381/1 |
| 2008/0031466 A1 | 2/2008 | Buck et al. | |
| 2008/0198779 A1 | 8/2008 | Jaermyr et al. | |
| 2008/0304675 A1 | 12/2008 | Roovers | |
| 2009/0074177 A1 | 3/2009 | Takada | |
| 2009/0088223 A1* | 4/2009 | Fratila | H04M 9/082 |
| | | | 455/570 |
| 2010/0266118 A1 | 10/2010 | Thi et al. | |
| 2012/0308025 A1 | 12/2012 | Hendrix et al. | |

OTHER PUBLICATIONS

Emura, Satoru, et al; Enhanced Frequency-Domain Adaptive Algorithm for Stereo Echo Cancellation; IEEE, 2002; pp. 1901-1904.

Gansler, Tomas, et al; New Insights Into the Stereophonic Acoustic Echo Cancellation Problem and an Adaptive Nonlinearity Solution; IEEE Transactions on Speech and Audio Processing, vol. 10, No. 5, Jul. 2002; pp. 257-267.

Makino, Shoji, et al; Subband Stereo Echo Canceller Using the Projection Algorithm With Fast Convergence to the True Echo Path; Acoustics Speech and Signal Processing 1997 ICASSP97 1997 IEEE International Conference on (1997) vol. 1, pp. 299-302 vol. 1.

Makino, Shoji; Sterophonic Acoustic Echo Cancellation: An Overview and Recent Solutions; Acoust. Sci. & Tech. 22, 5 (2001), pp. 325-333.

Shimauchi, Suehiro, et al; Stereo Projection Echo Canceller With True Echo Path Estimation; IEEE, 1995; pp. 3059-3062.

Yukawa, Masahiro, et al; Efficient Fast Stereo Acoustic Echo Cancellation Based on Pairwise Optimal Weight Realization Technique; Published in: Journal EURASIP Journal on Applied Signal Processing archive, vol. 2006, Jan. 1.

European Patent Office; International Search Report and Written Opinion; PCT Application No. PCT/US2012/020372, Apr. 17, 2012.

Taiwan Patent Office; Office Action; Taiwan Patent Application No. 100100695; Oct. 21, 2013.

Taiwan Patent Office; Office Action (English translation); Taiwan Patent Application No. 100100695; Oct. 21, 2013.

The International Bureau of WIPO; International Preliminary Report on Patentability; PCT Application No. PCT/US2012/020372; Jul. 10, 2013.

* cited by examiner

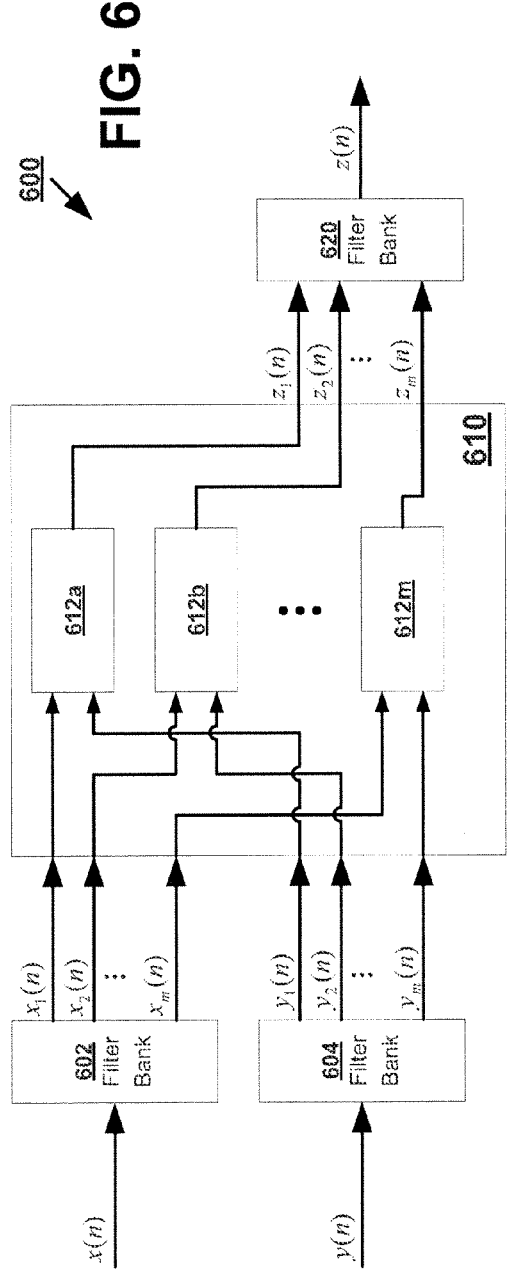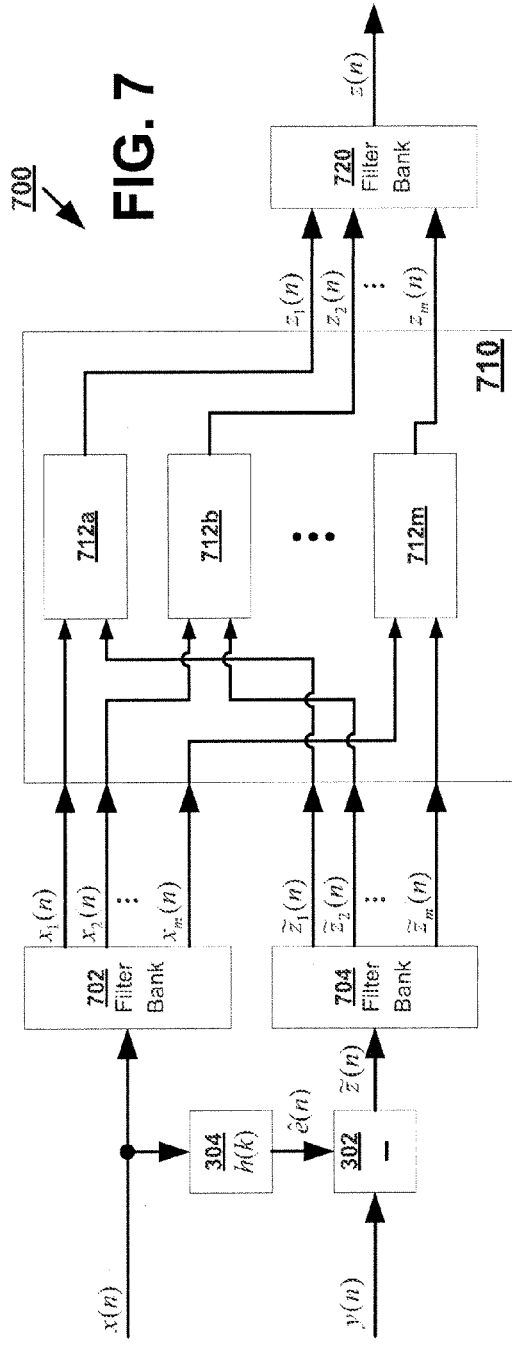

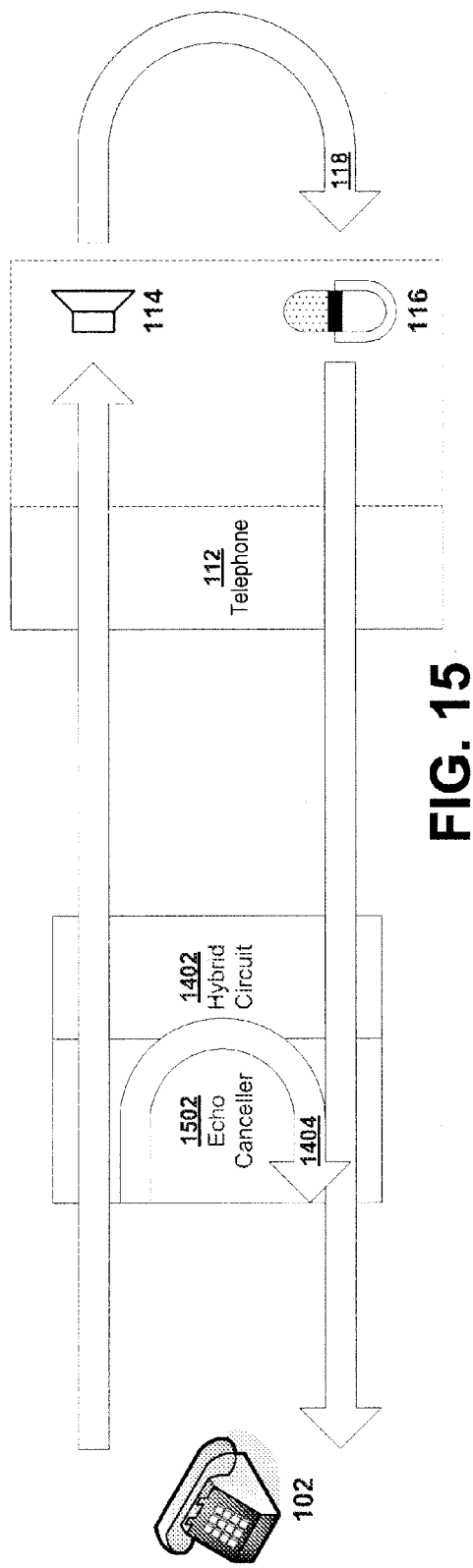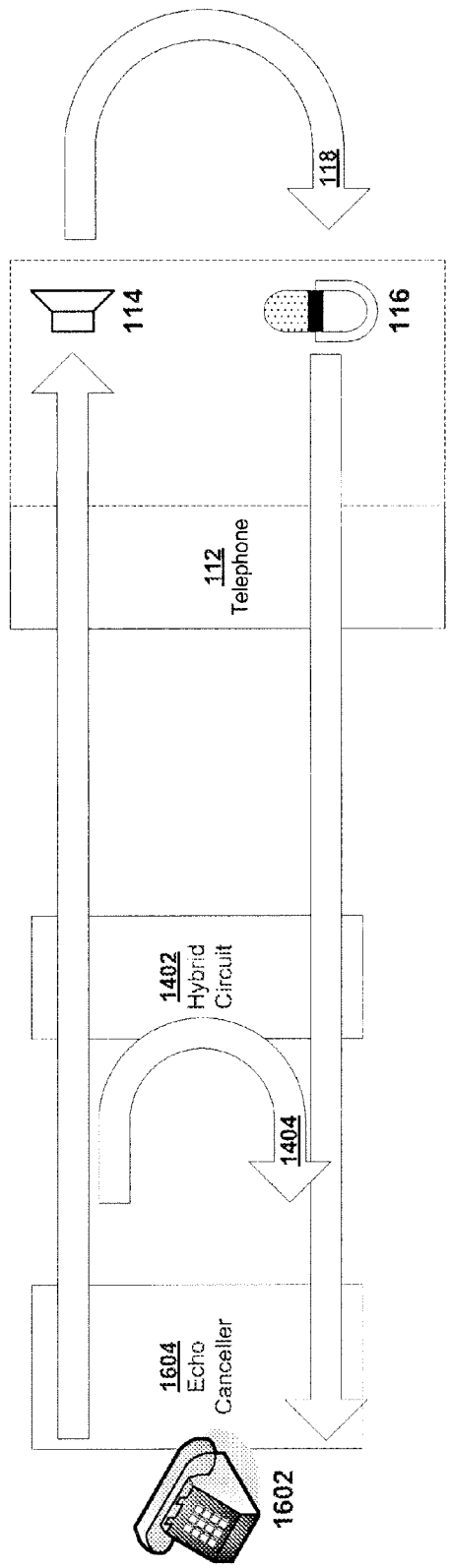

SYSTEMS AND METHODS FOR ECHO CANCELLATION AND ECHO SUPPRESSION

CROSS-REFERENCE TO RELATED APPLICATION

The present application is a continuation of U.S. Ser. No. 12/684,829, filed Jan. 8, 2010, now U.S. Pat. No. 8,634,569, which is hereby incorporated by reference for all purposes.

BACKGROUND OF THE INVENTION

1. Field of the Invention

The present invention relates generally to two-way communications systems and, specifically, to the suppression and cancellation of echoes in two-way communications system.

2. Related Art

In a two-way communications system, such as a telephony system, echoes are distracting and undesirable. Two common types of echoes are hybrid echoes, which are typically caused by impedance mismatches in hybrid circuits deployed in central offices, and acoustic echoes where a sound produced by a speaker is picked up by the microphone.

FIG. 1 illustrates echoes in a typical telephonic system, depicted here as either landline based or mobile. During a call between telephone 102 and telephone 112, telephone 102 transmits signal 104 and receives signal 106. In addition, microphone 116 of telephone 112 picks up signal 104 produced by speaker 114 and adds it to signal 106. This is shown as acoustic echo 118. Speaker 114 and microphone 116 can alternatively be part of another type of communications device such as an external speaker and microphone attached to a personal computer providing voice over Internet protocol (VoIP) communications.

Echo cancellation is the process of removing the echo from a system by producing an estimate of the echo and subtracting it from the received signal. FIG. 2 illustrates a model for an acoustic echo that may be used to perform echo cancellation. From the perspective of telephone 112, signal 104 is a far-end signal and signal 106 is a near-end signal. Speaker 114 transmits far-end signal 104 to the user, which is echoed back to microphone 116 as an acoustic echo. Echo canceller 300 comprises echo approximator 304 and subtractor 302. Echo approximator 304 received the far-end signal 104 and approximates the echo 118 added to signal 106. Approximate echo 306 is subtracted from near-end signal 106 to produce near-end signal 308. If echo approximator 304 accurately approximates the echo 118, then subtracting approximate echo 306 from near-end signal 106 would produce a signal 308 that approximates acoustic signal 202 without the echo.

The echo cancellation of FIG. 2 is described in further detail in the signal processing diagram shown in FIG. 3. The signals illustrated are digital signals. Echo e(n) is modeled as the result of echo transfer function 306 with impulse response s(k) applied to far-end signal x(n) and added with adder 308 to near-end signal d(n) resulting in a composite signal y(n). Generally, the index n is a time index that is a discrete time variable and the index k is the sampling time index of an impulse response. Adaptive filter 304 having impulse response h(k) approximates the echo of far-end signal x(n) shown as approximate echo ê(n). Subtractor 302 subtracts approximate echo ê(n) from signal y(n) to produce signal z(n) which is an approximation to near-end signal d(n).

Mathematically, the total received signal at the microphone is $$y(n) = e(n) + d(n), \quad (1)$$

where the echo is modeled by $$e(n) = \sum_{k=0}^{L-1} s^*(k) \times (n-k), \quad (2)$$

where s(k) is a finite impulse response of order L−1. The output of the echo canceller which is the signal transmitted by the telephone to the far-end is given by $$z(n) = y(n) - \hat{e}(n) \quad (3)$$

where ê(n) is the estimated echo and is approximated using an adaptive linear filter of order L−1 given by $$\hat{e}(n) = \sum_{k=0}^{L-1} h^*(n,k) \times (n-k), \quad (4)$$

where h(n, k) is the impulse response of the adaptive filter at time sample n. It should be noted that since the filter is adaptive it changes over time so the impulse response is also a function of time as shown.

The output of the echo canceller can also be expressed as $$z(n) = d(n) + \epsilon(n) \quad (5)$$

where $\epsilon(n) = e(n) - \hat{e}(n)$ is the residual echo. As the desired signal output signal z(n) is the near-end signal d(n) the objective of the echo canceller is to reduce the residual echo as much as possible.

One approach to adaptation of the adaptive filter is to minimize the mean squares error of the residual error $\epsilon(n)$. An adaptation approach known as least mean squares (LMS) yields the following adaptation equation $$h(n+1,k) = h(n,k) + \mu(n)z^*(n)x(n-k), \quad (6)$$

where μ(n) is a non-negative number and is the adaptation coefficient and 0≤k<L. While LMS typically achieves a minimum, rate of adaptation defined by the adaptation coefficient is left unspecified. Appropriate adaptation rate control can yield a fast convergence of the echo approximator to the echo.

If the adaptation coefficient varies over time, the adaptive filter algorithm is referred to as a variable step size least mean squares (LMS) adaptive filtering algorithm. Prominent among these is the normalized LMS (NLMS) algorithm, which uses the adaptation coefficient:

$$\mu(n) = \frac{\mu}{LP_{xx}^L(n)}, \quad (7)$$

where $LP_{xx}^L(n)$ is a short-term energy of near-end signal x(n) over a window of L samples, where L is the adaptive filter. For convenience, the short term energy is expressed in terms of the average energy over the window. The arithmetic average energy is equal to $$P_{xx}^L(n) = \frac{1}{L}\sum_{l=0}^{L-1}|x(n-l)|^2 \quad (8)$$

and where μ is a constant between 0 and 2. The NLMS adaptive filtering algorithm is insensitive to the scaling of x(n), which makes it easier to control its adaptation rate by an appropriate choice of the adaptation coefficient. However, the NLMS adaptive filtering algorithm performs poorly when there is background noise and double talk in the received signal.

Hansler, et al. ("Signal Channel Acoustic Echo Cancellation", Chapter 3 *Adaptive Signal Processing*, Springer, 2003) approximates the an optimal adaptation coefficient by $$\mu(n) = \frac{E\{z(n) \in (n)\}}{LP_{xx}^L(n)E\{|z(n)|^2\}}, \quad (9)$$

where E{x} is the expected value of x. Hansler discloses an "NLMS" adaptation coefficient without the $P_{xx}^L(n)$ term. The $P_{xx}^L(n)$ term is added for consistency in this disclosure. Expected values require knowledge of the statistics of the signal and are not suited for a changing environment. For example, if the echo path changes, the expected values can change. In order to use equation (9), the adaptive filter would need to be aware of the changing statistics.

Several conditions can make adaptation more difficult, including double talk, echo path change and background noise. Double talk is a condition when both parties are speaking, so there is substantial energy in both the far-end and near-end signals. A change in echo path can occur when the phone is moved into another environment. This amounts to a change in echo transfer function 204. To address background noise, typical echo cancellers estimate the background noise and adjust the adaptation rate depending on the amount of noise present (e.g., higher adaptation when the noise is low and slower adaptation when the noise is high relative to the signal level). For double talk, typical echo cancellers estimate the double talk periods and freeze adaptation during double talk periods.

Linear adaptive echo cancellation has been applied successfully to address echoes in the electronic environment. Acoustic echoes have additional, often significant, artifacts introduced by the background, such as noise, and dynamic echo paths causing the residual error. Non-linear processing (NLP) can be used in addition to or in place of the linear adaptive filtering. In a traditional system, NLP removes or suppresses the residual echo during single talk periods and it may insert comfort noise during that period. Generally, NLP does not do anything during double talk periods. Because the residual echo can still be significant during single and double talk periods, NLP is needed to add echo suppression to the linear echo cancellation.

An NLP system can remove the residual echo while maintaining the near signal quality for the listener. One technique used in an NLP system s a central clipping approach to remove the low volume signals, including the residual echo, at or below the central clipping threshold. A disadvantage of central clipping is that the near-end signal at or below the threshold is also removed, and that residual echo higher than the threshold of the central clipping may still be present. Another approach is comfort noise insertion, which removes or attenuates the linear echo canceller output and optionally inserts comfort noise when the far-end signals are higher than the output by a predetermined threshold and/or when the output is below the near-end signals by a different predetermined threshold. The performance under this approach is good when the residual echo is small and the linear echo canceller has converged well. However, in most acoustic cases, the residual echo is not small, even with a good linear echo canceller having good double talk detectors. Another known approach, switched loss, reduces the far-end signal volume when both the near-end and far-end-signals are high. By doing so, the echo is effectively reduced, as is the possibility of howling. The primary failing of traditional NLP is that it fails to suppress residual echo while maintaining full-duplex communications.

There is a need in the industry for an improved echo cancellation and/or suppression system which performs well in the presence of background noise, during periods of double talk and during changes in echo path, while maintaining full-duplex communications.

SUMMARY OF INVENTION

The full-duplex echo cancellation and suppression systems address the deficiencies in the prior art. One embodiment of an echo cancellation system comprises an echo approximator, a subtractor and an adaptation coefficient generator. The echo approximator is an adaptive linear filter and its adaptation is controlled by an adaptation coefficient provided by the adaptation coefficient generator. The adaptation coefficient generator generates an adaptation coefficient which approximates the optimal adaptation coefficient. The adaptation generator divides the result of an estimator function by a short term far-end power plus a predetermined value to prevent a division by zero. The estimator function can take several forms, but in general is a ratio of averages raised to a predetermined power. The ratio takes the average of the product of the output signal and the complex conjugate of the approximate echo generated by the echo approximator and divides it by the product of an average of the magnitude of the output signal and an average of the magnitude of the received signal power, where the received signal is the near-end signal mixed with the echo. In one embodiment the averages are standard arithmetic averages. In another embodiment the averages are root mean square averages. In still another embodiment, the averages are smooth averages. In still another embodiment, the averages are the square root of smooth averages of the magnitudes squared. A corresponding method generates an adaptation coefficient for an echo canceller using the same formulation described above.

In one embodiment of an echo suppression system, a filter bank is applied to the far-end signal to separate the signal into frequency sub-bands forming a joint time-frequency domain signal. A second filter bank separates an input signal into input frequency sub-band signals. The input signal can be the received signal at a microphone or can be the output of a linear echo cancellation system. Associated with each frequency sub-band is a non-linear processing unit, which performs non-linear processing on the input signal using the far-end signal to suppress the echo on a per sub-band basis.

In another embodiment, within each sub-band is also associated a linear echo canceller to partially cancel the echo. In this embodiment, the non-linear processing unit suppresses the residual echo.

One embodiment of the non-linear processing unit employs central clipping to suppress the echo. In another embodiment, comfort noise insertion is employed. In yet another embodiment, switched loss is employed. In still another embodiment, the received signal is attenuated by a scale factor determined by an estimator unit. In still another embodiment, the received signal is processed through a linear filter with coefficients determined by an estimator unit. In still another embodiment, the estimator unit feeds back estimates to the echo canceller to refine the adaptation coefficient for the echo canceller.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 6 illustrates a full duplex sub-band non-linear processing system;

FIG. 7 illustrates a full duplex sub-band non-linear processing system with a linear echo canceller;

FIG. 15 shows a telephonic communications system where an echo canceller built into or attached to the hybrid circuit; and FIG. 16 shows another telephonic communications system where an echo canceller is built into a telephone.

DETAILED DESCRIPTION

A detailed description of embodiments of the present invention is presented below. While the disclosure will be described in connection with these drawings, there is no intent to limit it to the embodiment or embodiments disclosed herein. On the contrary, the intent is to cover all alternatives, modifications and equivalents included within the spirit and scope of the disclosure.

Figure 1:
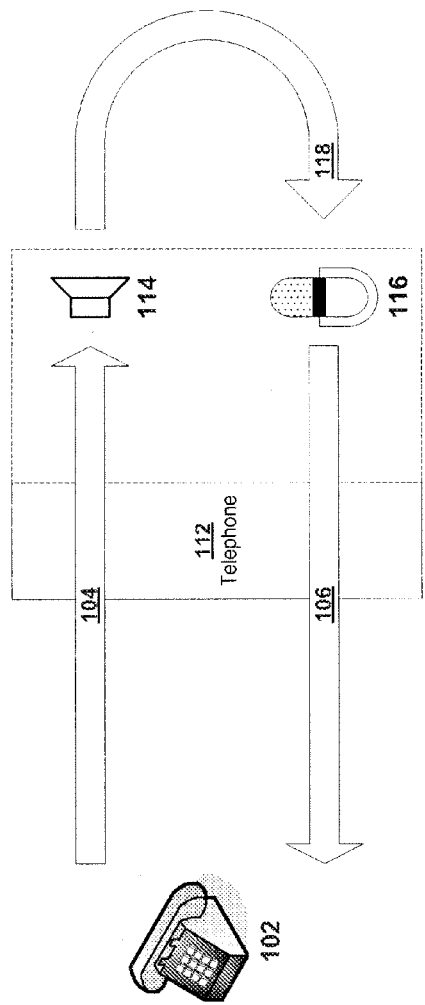
FIG. 1 illustrates a typical telephonic system.
Figure 2:
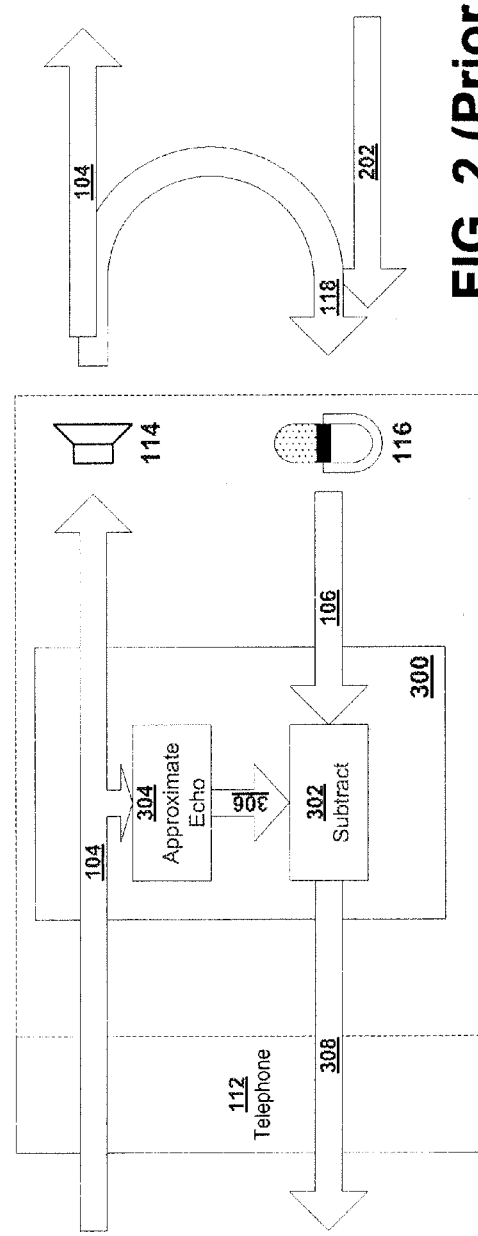
FIG. 2 illustrates a typical echo cancellation system.
Figure 3:
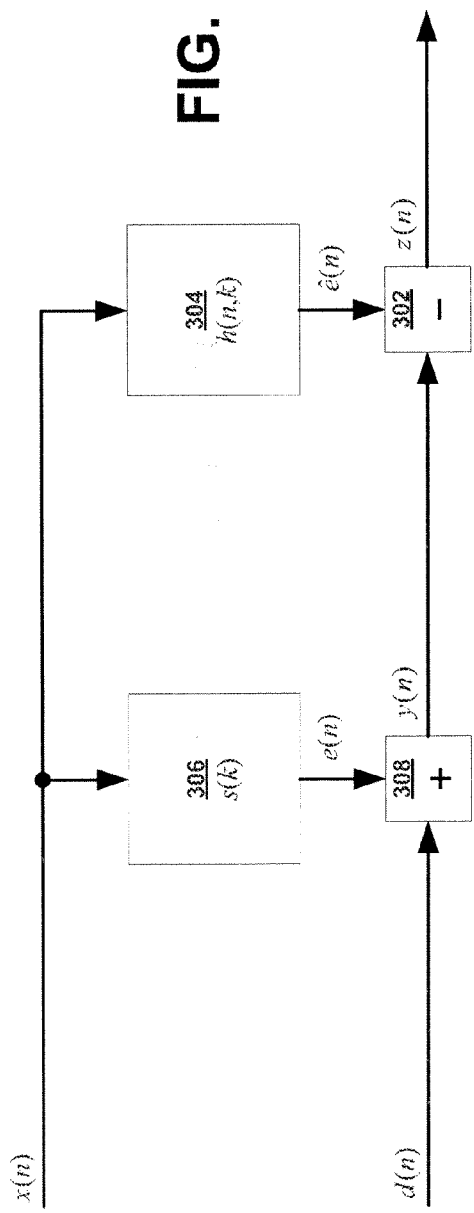
FIG. 3 is a signal processing diagram of a typical echo cancellation system.
Figure 4:
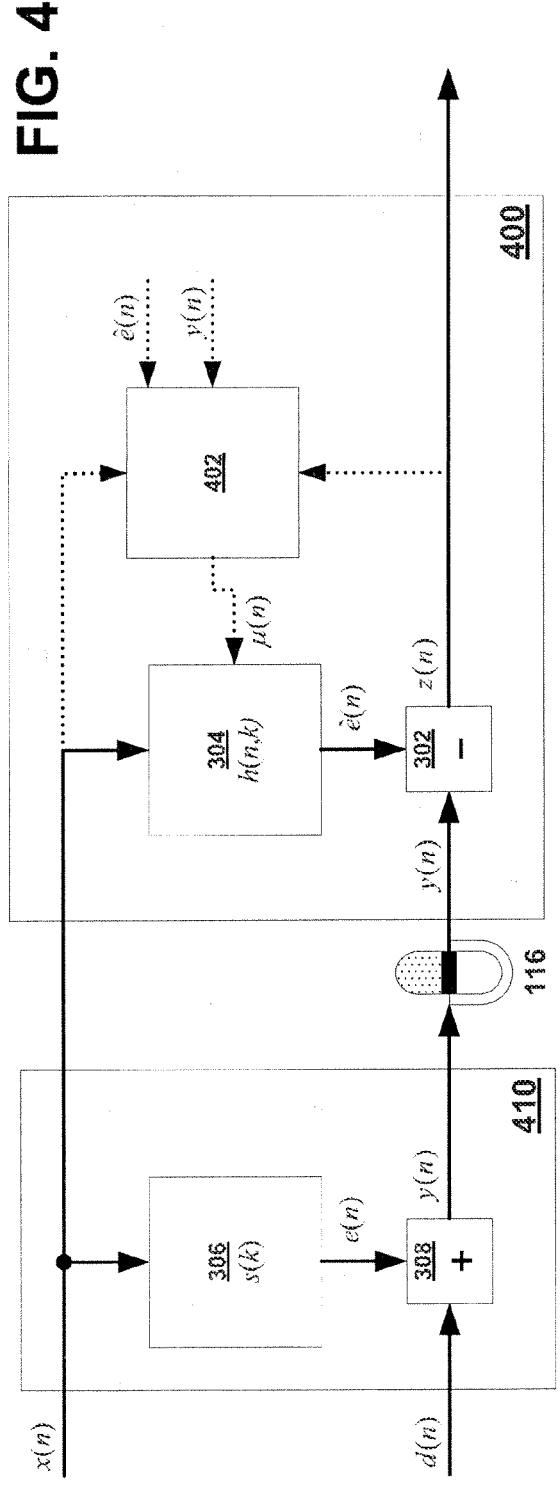
FIG. 4 illustrates an exemplary embodiment of an echo cancellation system.

FIG. 4 illustrates an exemplary embodiment of an echo cancellation system. Echo cancellation system 400 comprises echo approximator 302 and subtractor 304 which function as previously described. Specifically, echo approximator 302 generates an approximate echo which is then subtracted from the received signal y(n) at microphone 116 and produces an echo cancelled output signal z(n). It further comprises adaptation coefficient generator 402 which can use the received signal y(n), the output signal z(n), the far-end signal x(n) and the approximate echo ê(n) to generate an adaptation coefficient μ(n) for every time index n. The adaptation coefficient can the be used with equation (6) to control the adaptation rate of echo approximator 302.

Dotted box 410 represents the echo generation produced by the environment which is modeled as echo transfer function 306 with impulse response s(k) and adder 308. These elements are not part of the echo cancellation system, but illustrate the signal processing environment of a telephone.

The echo approximator, subtractor and adaptation coefficient generator made reside in software, firmware or implemented in hardware or some combination thereof. One such implementation would be as software or firmware executed on a digital signal processor (DSP) where each component described would be implemented as a set of instructions for the digital signal processor. In another embodiment, some of the functionality could be implemented as software or firmware executed on a DSP with some portions of implemented with application specific logic.

Adaptation coefficient generator 402 approximates the optimal adaptation coefficient which can be expressed by $$\mu(n) = \frac{z^*(n)\epsilon(n) + z(n)\epsilon^*(n)}{2|z(n)|^2 LP^L_{xx}(n)} = \frac{Re\{z(n)\epsilon^*(n)\}}{|z(n)|^2 LP^L_{xx}(n)}, \quad (10)$$

where | | is standard notation of the absolute value, Re{ } is standard notation for the real part of a complex number, and * is standard notation for the complex conjugate of a complex number.

When all signals are real, then $z^*(n) = z(n)$ and $\epsilon^*(n) = \epsilon(n)$ and equation (10) becomes $$\mu(n) = \frac{|z(n)\epsilon(n)|}{|z(n)|^2 LP^L_{xx}(n)}. \quad (11)$$

Equation (11) has advantages over equation (9) in the prior art. First, equation (11) is an optimal adaptation coefficient while equation (9) is an approximation to an optimal adaptation coefficient. Second, equation (9) does not perform well in the presence of background noise, during double talk or with the echo path changing, whereas equations (10) and (11) are optimal under those conditions. Finally, equation (10) and (11) do not require statistics of any signal and only uses a short term average of any signal.

Unfortunately, the residual echo ε(n) is not directly available. In principle, estimating the residual echo is a difficult problem. However, the adaptation coefficient of equations (10) and (11) can be made more tractable by using averages over an observation window rather than values at a given time. As a result equation (10) can be estimated by using $$\mu(n) = \frac{Re\{P^N_{z\epsilon}(n)\}}{P^N_{zz}(n) LP^L_{xx}(n)}, \quad (12)$$

where $P_{z\epsilon}^N(n)$ is an arithmetic average of $z(n)\epsilon^*(n)$ over a given period of time and is defined as $$P_{ze}^N(n) = \frac{1}{N}\sum_{l=0}^{N-1} z(n-l)e^*(n-l). \quad (13)$$

where N is the length of the smooth observation window. Equation (12) is more useable than equation (10) in that it is easier to estimate values such as the residual echo over a time window rather than for each point in time. Furthermore, the use of time averages smoothes the adaptation coefficient so that abrupt changes in the adaptation of the adaptive filter are mitigated and the adaptive filter maintains a smooth function.

The arithmetic averages in equation (12) as well as equations (10) and (11) can be generalized by a generic average. It should be noted that the operator $\mathcal{A}\{\}$ used in this disclosure and related operators $\mathcal{A}_1\{\}$, $\mathcal{A}_2\{\}$, are intended to convey a generic sense of an average. Within the same equation the $\mathcal{A}\{\}$ operator may convey a different average if the operands are different. For example within the same equation $\mathcal{A}\{a(n)\}$ may be an arithmetic average of a(n) over an observation window of size M and $\mathcal{A}\{b(n)\}$ may be a root mean square average of b(n) over an observation window of size N. The use of subscripts are used to indicate that two averages are of potentially different types even with the same operand, for example if $\mathcal{A}\{a(n)\}$ appears twice in an equation the same average is intended to be used. However, if $\mathcal{A}_1\{a(n)\}$ and $\mathcal{A}_2\{a(n)\}$, they should not be assumed to be the same averages. Furthermore, depending on the context and desired implementation $\mathcal{A}\{\}$ can be selected from a variety of averages including but is not limited to arithmetic averages, root mean square averages, harmonic averages, the smooth averages described below or their weighted variants as well as other less conventional averages such as the median, the maximum, or the mode over an observation window.

It is convenient the sake of this disclosure to introduce the following notations, $$\tilde{P}_{xy}^\alpha(n) = \alpha x(n)y^*(n) + (1-\alpha)\tilde{P}_{xy}^\alpha(n-1) \quad (14)$$

and $$\tilde{P}_x^\alpha(n) = \alpha|x(n)| + (1-\alpha)\tilde{P}_x^\alpha(n-1), \quad (15)$$

where $0<\alpha<1$. Equation (14) and (15) are smooth averages which approximate an arithmetic average for the appropriate choice of $\alpha$. Typically, with $\alpha$ is inversely proportional to N, $$\tilde{P}_{xy}^\alpha(n) \approx P_{xy}^N(n). \quad (16)$$

Using the approximation given in equation (14) with equation (12) requires less memory than storing old signal values in computing the adaptation coefficient. Regardless of the simplifications, $P_{ze}^N(n)$ may still be difficult to estimate.

It is desirable that the adaptation coefficient be a function of signals available to the echo canceller and approximate the optimal adaptation coefficient of equations (10) or (11) or the time averaged adaptation coefficient of equation (12). Signals readily accessible to the echo canceller include the far-end signal x(n), the received signal at the microphone y(n), the echo canceller output signal z(n), and the approximate echo ê(n). This leads to a general form of an adaptation coefficient given by $$\mu(n) = \frac{f(x, y, \hat{e}, z, n)}{LP_{xx}^L(n) + \Delta}. \quad (17)$$

In equation (17), $P_{xx}^L$ can be generalized to any average of $|x(n)|^2$ resulting in $$\mu(n) = \frac{f(x, y, \hat{e}, z, n)}{L\mathcal{A}\{|x(n)|^2\} + \Delta}. \quad (18)$$

A noteworthy example is when $\mathcal{A}\{|x(n)|^2\} = \tilde{P}_{xx}^\alpha(n)$. The adaptation coefficients in equations (17) and (18) can be completely determined since x(n) is the far-end signal which is the signal produced by the speaker (such as in a telephone), y(n) is the signal received by the microphone, ê(n) is the approximate echo generated by the echo canceller and z(n) is the output of the echo canceller, all quantities available to the echo canceller. The constant $\Delta$ is a small number designed to prevent $\mu$ from becoming large during periods of silence in the far-end signal, i.e., when $P_{xx}$ is zero or near zero. Essentially the constant $\Delta$ is used to prevent division by zero. Often, it is desirable to maintain the adaptation coefficient below a given maximum value $\mu_{max}$ to maintain bounds on the adaptation. To this end, a limiter function, $\mathcal{L}_\mu(x) = \max(\mu_{max}, \min(0, x))$, can be applied to the result of equation (17) and/or (18) to maintain the value of the adaptation coefficient between 0 and $\mu_{max}$. In equation (17) and (18), $f$ is an estimator function, which is a non-negative function that is approximately optimal against background noise, double talk and echo path changing, and $P_{xx}^L$ normalizes it in accordance with the far-end power.

An example of such an estimator is given by the general equation $$f(x, y, \hat{e}, z, n) = \left[\frac{|\mathcal{A}\{z(n)\hat{e}^*(n)\}|^2}{\mathcal{A}\{|z(n)|^2\}\mathcal{A}\{|y(n)|^2\}}\right]^\nu \quad (19)$$

where $\nu$ is a non-negative value. If $\nu$ equals ½, then the estimator is inversely proportional to the output power. During periods of high background noise or near-end talk where the output power z(n) of the echo canceller increases. According to equation (19) the estimator is responsive to periods of high background noise and double talk and the adaptation is slowed during these periods. When the echo path changes the cross correlation average, $|\mathcal{A}\{z(n)\hat{e}^*(n)\}|^2$, increases causing the adaptive filter to more quickly adapt to the change in the echo path.

In one embodiment arithmetic averages are used, so equation (19) becomes $$f(x, y, \hat{e}, z, n) = \left[\frac{|P_{z\hat{e}}^{N_1}(n)|^2}{P_{zz}^{N_2}(n)P_{yy}^{N_3}(n)}\right]^\nu, \quad (20)$$

where arbitrary observation window sizes have be given to each of the averages in equation (20). However, the same observation window can be used (i.e., $N_1 = N_2 = N_3$.)

In another embodiment smooth averages are used, so equation (19) becomes $$f(x, y, \hat{e}, z, n) = \left[\frac{|\tilde{P}_{z\hat{e}}^{\beta_1}(n)|^2}{\tilde{P}_{zz}^{\beta_2}(n)\tilde{P}_{yy}^{\beta_3}(n)}\right]^\nu \quad (21)$$

again arbitrary observation window sizes have be given to each of the averages in equation (21). Once again, the same window can be used (i.e., $\beta_1=\beta_2=\beta_3$).

In another embodiment, the estimator function is given by the equation.

$$f(x, y, \hat{e}, z, n) = \left[ \frac{|\mathcal{A}\{z(n)\hat{e}^*(n)\}|}{\mathcal{A}\{|z(n)|\}\mathcal{A}\{|y(n)|\}} \right]^{2\nu}, \quad (22)$$

Equation (22) is similar to equation (19) except that in the denominator the averages of $|z(n)|$ and $|y(n)|$ is used instead of $|z(n)|^2$ and $|y(n)|^2$ In fact, equation (22) is a generalization of equation (19). In particular if the root-mean-square (RMS) average is used in the denominator then $\mathcal{A}\{|z(n)|\}=\sqrt{P_{zz}^{N_2}(n)}$ and $\mathcal{A}\{|y(n)|\}=\sqrt{P_{yy}^{N_3}(n)}$ and an arithmetic average is used in the numerator, then equation (22) simplifies to equation (20). If the square root of the smooth average of $|z(n)|^2$ and $|y(n)|^2$ is used, i.e., $\mathcal{A}\{|z(n)|\}=\sqrt{\tilde{P}_{zz}^{\beta_2}(n)}$ and $\mathcal{A}\{|y(n)|\}=\sqrt{\tilde{P}_{yy}^{\beta_3}(n)}$, then equation (22) simplifies to equation (21). Another noteworthy average that can be used is given by equation (23)

$$\mathcal{A}\{|z(n)|\} = \sqrt[\gamma]{\frac{1}{N}\sum_{l=0}^{N-1}|z(n-l)|^\gamma}. \quad (23)$$

In particular the average of equation (23) becomes an arithmetic average of $|z(n)|$ when $\gamma=1$ and an RMS average when $\gamma=2$. Furthermore, when $\gamma=\infty$, $\mathcal{A}\{|z(n)|\}=\max\{z(n)$ over the observation window$\}$.

Other embodiments use the smooth average variant of equation (23) can also be used in particular $\mathcal{A}\{|z(n)|\}^\gamma = \sqrt{\tilde{P}_z^{\gamma,\beta_2}(n)}$, where in general, $$\tilde{P}_x^{\gamma,\alpha}(n)=\alpha|x(n)|^\gamma+(1-\alpha)\tilde{P}_x^{\gamma,\alpha}(n-1). \quad (24)$$

In the embodiment when $\gamma=1$, equation (22) becomes, $$f(x, y, \hat{e}, z, n) = \left[ \frac{|\tilde{P}_{ze}^{\beta_1}(n)|}{\tilde{P}_z^{\beta_2}(n)\tilde{P}_y^{\beta_3}(n)} \right]^{2\nu}. \quad (25)$$

Because the smooth averages can be updated by using $|z(n)|$ and $|y(n)|$ rather than $|z(n)|^2$ and $|y(n)|^2$ avoiding extra multiplications and square root operations, equation (25) is a computationally more efficient estimator function. Experimentally, it has been shown that these estimators work well even in the presence of double talk, background noise and echo path changing.

The optimality of equation (10) and can be derived by minimizing $$\Delta h(n,k)=s(k)-h(n,k), \quad (26)$$

with respect to the adaptation coefficient. Ideally, impulse response of the adaptive filter h(n, k) and the impulse response of the echo transfer function s(k) should be the same. However, in principle, they do not match. The error is the difference between the two and characterized by equation (26).

Equation (26) becomes $$\Delta h(n+1,k)=\Delta h(n,k)-\mu(n)z^*(n)x(n-k) \quad (27)$$

after substituting adaptation equation (6). To minimize $\Delta h$, a least squares approach is taken, that is the cost function, $$E_{\Delta h}(n) = \sum_{k=0}^{L-1}|\Delta h(n,k)|^2 \quad (28)$$

is minimized. By substituting equation (27) into equation (28) and expanding the expression, the cost function can be re-written as $$E_{\Delta h}(n+1) = \quad (29)$$

$$E_{\Delta h}(n) - \mu(n)z^*(n)\epsilon(n) - \mu(n)z(n)\epsilon^*(n) + \mu^2(n)|z(n)|^2\sum_{k=0}^{L-1}|x(n-k)|^2.$$

Finding an optimum value is achieved by finding a zero in the derivative of the cost function with respect to the adaptation coefficient. Specifically, the derivative is expressed as $$\frac{\partial}{\partial \mu}E_{\Delta h}(n+1) = -z^*(n)\epsilon(n) - z(n)\epsilon^*(n) + 2\mu(n)|z(n)|^2 L P_{xx}^L(n). \quad (30)$$

By setting the derivative to zero and solving for p(n), the optimal adaptation coefficient given in equation (10) is found.

One caveat is that the initial conditions to the adaptive filter cannot be set to zero because that would cause estimated echo, ê(n) to be zero leading to a zero estimator function value. In addition, the adaptation coefficient should be monitored to insure it is not zero—for example, a small value can be substituted for the adaptation coefficient when it is zero.

Figure 5:
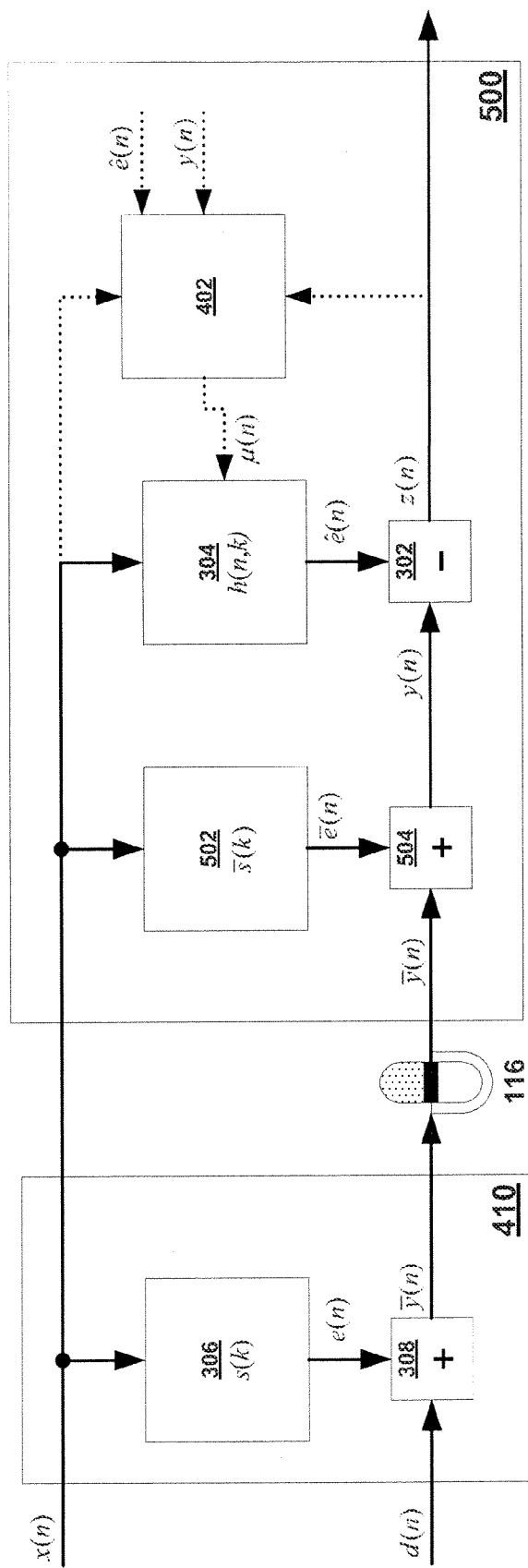
FIG. 5 illustrates a linear adaptive echo canceller using the adaptation system using a synthetic echo.

FIG. 5 illustrates an embodiment of a linear adaptive echo canceller using an adaptation system with a synthetic echo. Like adaptive echo canceller 400, echo canceller 500 comprises echo approximator 302, subtractor 304 and adaptation coefficient generator 402. The linear adaptive echo canceller 500 comprises echo synthesizer 502 and adder 504 which mixes synthesized echo ē(n) with the signal received at the microphone ȳ(n) to yield y(n). The nomenclature of the signals ȳ(n) and y(n) differs slightly from that of the system described with reference to FIG. 4. In particular, the signal received at the microphone is labeled as ȳ(n) instead of y(n). This is to preserve the notation of the adaptive coefficient formulae disclosed above. The synthesized echo ē(n) is the product of a transfer function with impulse response s̄(k) of order L−1 applied to the far-end signal x(n), specifically, $$\bar{e}(n) = \sum_{k=0}^{L-1}\bar{s}^*(k)x(n-k). \quad (31)$$

Since the impulse response of the echo synthesizer is known, the adaptive filter coefficients can be initialized to that of the synthetic echo, i.e., s̄(k)=h(0, k). In this way, the synthetic echo is cancelled initially. Adding a synthetic echo component guarantees that the approximate error ê is not always zero, thus preventing the adaptive coefficient from reaching a state where the adaptive coefficient is constantly zero. Because the synthetic echo is artificially created, the impulse response is known so the linear adaptive filter will cancel the synthetic echo.

In the embodiment described above, linear adaptive echo cancellation has been disclosed. In addition to linear adaptive echo cancellation, non-linear processing can be used to suppress the residual echo left over from an adaptive echo cancellation system or even suppress the echo outright. Previous non-linear processing systems are undesirable, causing the telephone to behave as if constantly switching between full-duplex and half-duplex operation.

FIG. 6 illustrates a full duplex sub-band non-linear processing system. System 600 receives the far-end signal x(n) as well as the signal received at the microphone y(n) which comprises the near-end signal combined with any echo. The non-linear processing is applied in a joint frequency-time domain context. To achieve this, filter bank 602 separates the far-end signal into M frequency sub-bands—that is, each signal $x_i(n)$ is formed from the frequency components of the far-end signal which fall into the ith frequency band. Likewise, filter bank 604 subdivides the signal y(n) into M frequency sub-bands. Non-linear processing unit 610 comprises M sub-units 612a, 612b, through 612m which perform non-linear processing on each sub-band component. The non-linear processing sub-units are described in greater detail below. Finally, synthesis filter bank 620 combines the filtered output signal $z_i(n)$ for each frequency sub-band into a combined output signal z(n). In one embodiment, the filter banks are constructed as described in Y. Lu and J. M. Morris, "Gabor Expansion for Adaptive Echo Cancellation", IEEE Signal Processing Magazine, Vol. 16, No. 2, March, 1999.

FIG. 7 illustrates an alternative embodiment which is similar to the non-linear processing system described in FIG. 6 except linear echo cancellation is performed by echo estimator 304 and subtractor 302. There also can be an adaptation coefficient generator which is not shown for clarity. Filter bank 702 performs the same function as filter bank 602, and filter bank 704 subdivides the output of the linear echo canceller signal $\tilde{z}(n)$ into M frequency sub-band components, $\tilde{z}_i(n)$. Non-linear processing unit 710 comprises M sub-units 712a, 712b, through 712m which perform non-linear processing on each sub-band component. Finally, synthesis filter bank 720 combines the filtered output signal $z_i(n)$ for each frequency sub-band into a combined output signal z(n). Unlike nonlinear processing unit 610, non-linear processing unit 710 in this embodiment is used to suppress the residual echo rather than the full echo. The non-linear processing is performed for each frequency sub-band by the non-linear processing sub-units.

In one embodiment, comfort noise insertion is used such that if the far-end signal is greater than the output of the linear echo canceller by a predetermined threshold and/or the output is below the signal received at the microphone by a different predetermined threshold, the output is removed. Most generally comfort noise insertion is stated as $$z_i(n) = \begin{cases} g_1 \tilde{z}_i(n) + g_2 nc_i(n) & \text{if } dist\{d(n), \tilde{z}_i(n)\} > \\ & T_1 \text{ and/or } dist\{y_i(n), \tilde{z}_i(n)\} > T_2 \\ \tilde{z}_i(n) & \text{otherwise,} \end{cases} \quad (32)$$

where dist{a(n), b(n)} is a measure for the distance between two sequences a(n) and b(n) at time index n, $T_1$ and $T_2$ are the predetermined thresholds and $nc_i(n)$ is comfort noise. There are many useful distance measures between two sequences. One useful example is the distance between the present signal values, (i.e., dist{a(n), b(n)}=|a(n)−b(n)|).

Another useful is example takes the most recent N samples of each sample and apply a vector distance operation such as in equations (33) and (34):

$$dist\{a(n), b(n)\} = \sum_{l=0}^{N-1} |a(n-l) - b(n-l)| \quad (33)$$

$$dist\{a(n), b(n)\} = \sqrt{\sum_{l=0}^{N-1} |a(n-1) - b(n-1)^2|}. \quad (34)$$

Unlike the traditional comfort noise insertion NLP method, this comfort noise insertion is performed on a per frequency sub-band basis. The attenuation terms $g_1$ and $g_2$ are typically predetermined numbers between and inclusive of 0 and 1. In one embodiment, $g_1=0$ and $g_2=1$, corresponds to a comfort noise replacement NLP method where the output of the echo canceller is completely replaced by comfort noise. In another embodiment, when $g_1>0$, the output of the echo canceller is attenuated but not removed, and corresponds to a "soft" NLP method used in traditional NLP. In yet another embodiment, $nc_i(n)=0$ for some or all frequency sub-bands, that is instead of comfort noise, silence is introduced.

As an example, if the far-end user has a lower pitch voice than the near-end user, they can both speak, but the non-linear processing sub-units responsible for the low frequency may replace the received microphone signal, since the near-end speaker's voice will not be affected having a higher pitch. Further, the echo from the far-end speaker would be replaced because the echo will generally be in the same frequency range. As a result, the residual echo is suppressed and both users can talk. Without sub-band NLP, either one user would be suppressed or the residual echo would be permitted to remain during this double talk period. This technique can also be applied to the NLP performed by non-linear processing unit 610.

Figure 8:
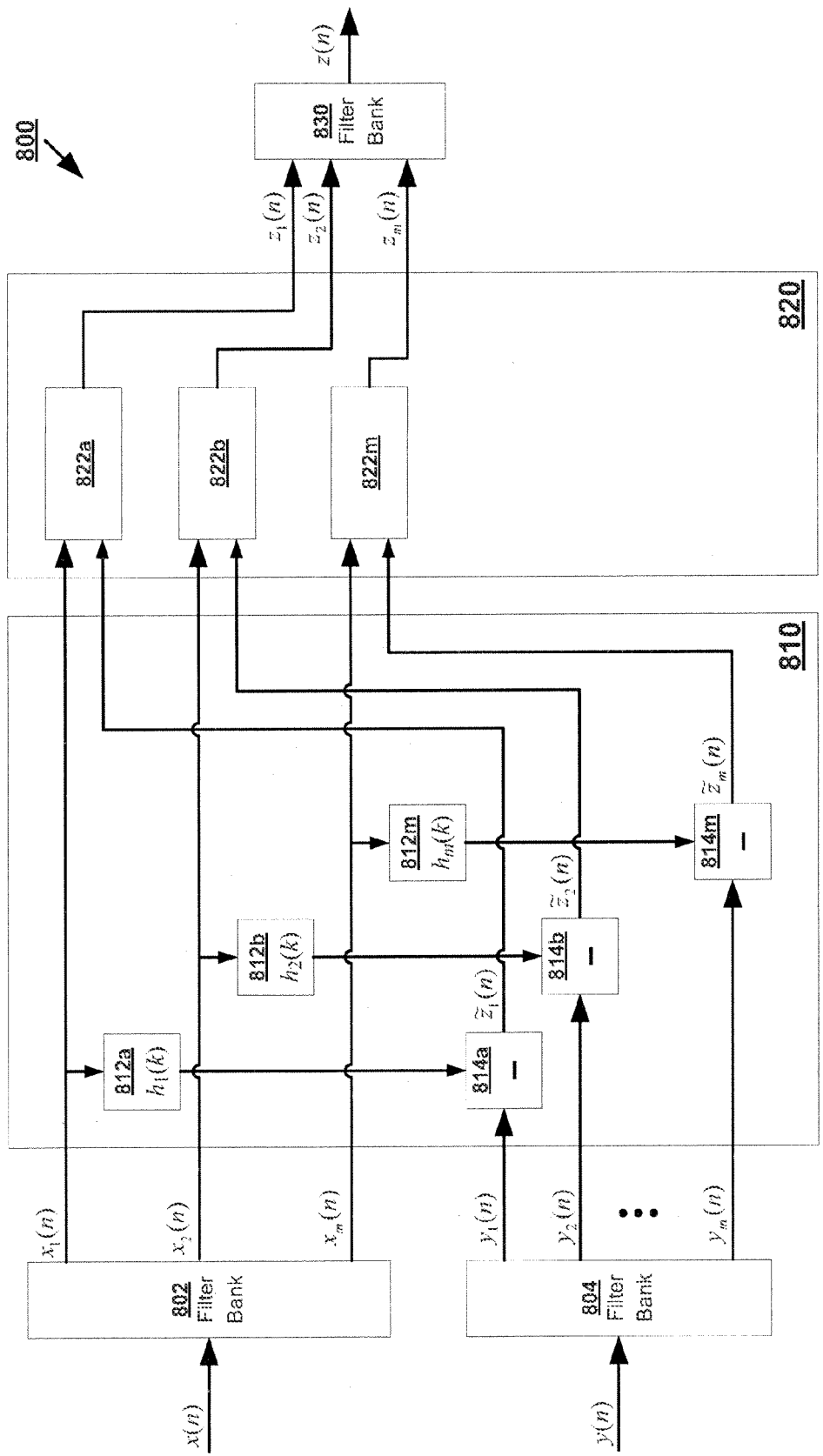
FIG. 8 illustrates a full duplex sub-band non-linear processing system with sub-band linear echo cancellers.

FIG. 8 is another embodiment of a sub-band based echo cancellation system. System 800 differs from the previous embodiments in that the linear echo cancellation is performed per frequency sub-band. Filter bank 802 separates far-end signal x(n) into M frequency sub-band components. Filter bank 804 separates the signal y(n) into M frequency sub-band components. Linear echo canceller 810 comprises echo approximator 812a, 812b, through 812m and subtractors 814a, 814b, through 814m each of which perform linear echo cancellation within their respective sub-bands. Each can also include an adaptation coefficient generator (not shown). Non-linear processing unit 820 comprises M sub-units 822a, 822b, through 822m which perform non-linear processing on each sub-band component. Finally, synthesis filter bank 830 combines the filtered output signal $z_i(n)$ for each frequency sub-band into a combined output signal z(n). Within each sub-band is a complete echo cancellation system with a linear echo canceller and an NLP echo suppressor.

In another embodiment, central clipping is used, so that if the signal received at the microphone for particular frequency sub-band $y_i(n)$ is below a central clipping threshold, that signal is simply removed. Mathematically, this can simply be expressed as $$z(n) = \begin{cases} \tilde{z}_i(n) & \text{if } dist\{y_i(n), 0\} > T \\ 0 & \text{otherwise,} \end{cases} \quad (35)$$

where T is a predetermined threshold. The suppression is performed on a per frequency sub-band basis which allows operation in a full-duplex setting.

In another embodiment, far-end attenuation is used along with a synthesis filter bank to reassemble far-end signal components that may have certain frequencies attenuated in accordance with the traditional far-end attenuation NLP.

Figure 9:
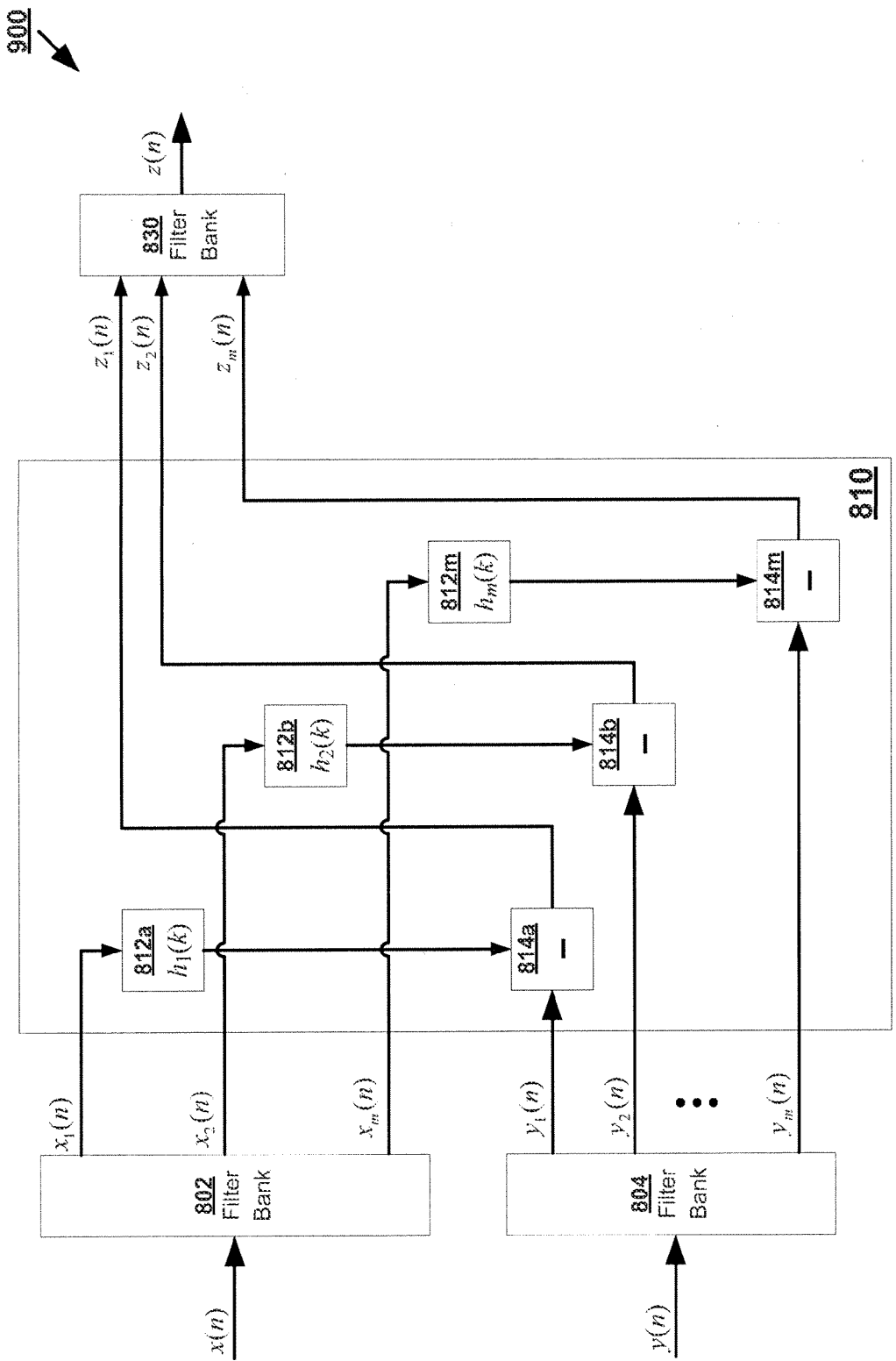
FIG. 9 illustrates an echo cancellation system with sub-band linear echo cancellers.

FIG. 9 illustrates another embodiment of a sub-band linear echo cancellation system. System 900 is similar to system 800 except it does not have non-linear processing unit 820. Because each sub-band is a linear echo cancellation system in its own right, the optimal adaptation coefficients derived above can be applied independently per sub-band, that is, each sub-band would use its own $\mu_i(n)$. In each sub-band, certain statistical assumptions can be made within a sub-band that cannot be made in a full band environment (discussed further below) and, as a result, some averages such as $P_{z_i\epsilon_i}^N(n)$ are easier to estimate.

Figure 10:
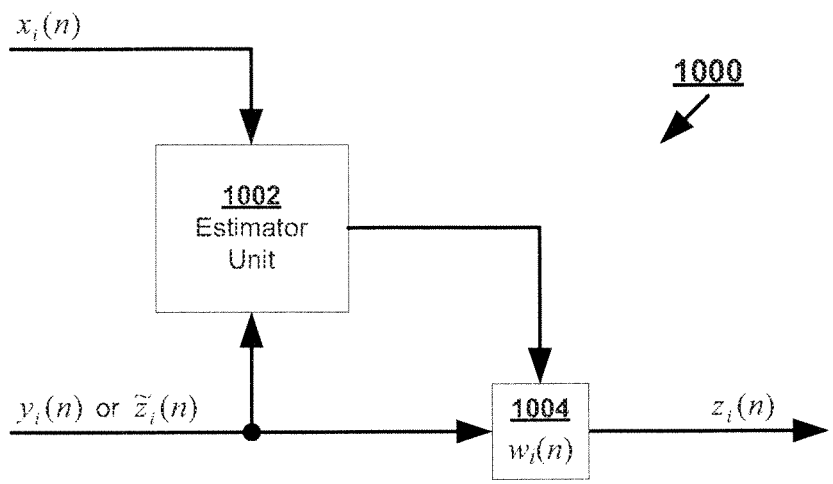
FIG. 10 shows an exemplary embodiment of a sub-band non-linear processing unit.

FIG. 10 shows a sub-band non-linear processing unit which can be used with systems 600, 700 and/or 800. Sub-band non-linear processing unit 1000 comprises estimator unit 1002 which receives the $i^{th}$ sub-band component of the far-end signal shown as $x_i(n)$ and the $i^{th}$ sub-band component of the received signal in the case of system 600 shown as $y_i(n)$ or the $i^{th}$ sub-band component of the output of a linear echo canceller in the case of system 700 or 800 shown as $\tilde{z}_i(n)$. Estimator unit 1002 computes a weight, $w_i(n)$, which is applied by scaler 1004 to either $y_i(n)$ or $\tilde{z}_i(n)$, depending on which system is used to produce an output. Mathematically, $$z_i(n) = w_i(n) y_i(n)$$

or $$z_i(n) = w_i(n) \tilde{z}_i(n). \tag{36}$$

For the sake of simplification in this example, $\tilde{y}_i(n)$ is used to denote the input the sub-band non-linear processing unit, it equal to $y_i(n)$ in system 600 and equal to $\tilde{z}_i(n)$ in system 700 or 800. One adaptive method to adjust the weights is governed by the following equation:

$$w_i(n) = f(u_i(n)), \tag{37}$$

where $$u_i(n) = \mathcal{L}\left(\frac{\mathcal{A}_1\{|\tilde{y}_i(n)|^2\} - q_i^*(n, M)\mathcal{A}_1\{|x_i(n-M)|^2\}}{\mathcal{A}_2\{|\tilde{y}_i(n)|^2\} + \Delta_i}\right) \tag{38}$$

where $\Delta_i$ is a constant that prevents a divide by zero condition when $\tilde{y}_i$ is zero over the time window. The function $f$ is typically a non-negative monotonically increasing function with $f(1)=1$. Specifically $f(x)=x^v$ can be used where v is a fractional value. For example, v could be selected to have a value of ½, so $f(x)=\sqrt{x}$, but other values of v can be used depending on the application. The function $\mathcal{L}$ limits the result to be between and including 0 and 1, more specifically, $$\mathcal{L}(x) = \max(0, \min(1,x)). \tag{39}$$

Regarding averages, $\mathcal{A}_1\{|\tilde{y}_i(n)|^2\}$ and $\mathcal{A}_2\{|\tilde{y}_u(n)|^2\}$ are averages of $|\tilde{y}_i(n)|^2$ over two observation windows, while these averages can be different types of averages over different observation windows, they often chosen to be the same type of average over the same observation window. Additionally, $\mathcal{A}_1\{|x_i(n)|^2\}$ is an average value of $|x_i(n)|^2$ over another observation window which can be distinct from the observation windows for $|\tilde{y}_i(n)|^2$. The number K is the number which yields the maximum value for $|q_i(n, K)|$. The quantity $q_i(n, k)$ is given by $$q_i(n, k) = \left|\frac{\mathcal{A}\{\tilde{y}_i(n) \times (n-k)\}}{\mathcal{A}_2\{|x_i(n-k)|^2\}}\right| \tag{40}$$

where $\mathcal{A}_2\{|x_i(n)|^2\}$ is an average value of $|x_i(n)|^2$ over an observation window. While typically the same type of average is used for $\mathcal{A}_1\{|x_i(n)|^2\}$ and $\mathcal{A}_2\{|x_i(n)|^2\}$, the observation window used for $\mathcal{A}_1\{|x_i(n)|^2\}$ is typically smaller than that used for $\mathcal{A}_2\{|x_i(n)|^2\}$. When arithmetic averages are used, equations (38) and (40) become $$u_i(n) = \mathcal{L}\left(\frac{P_{\tilde{y}_i\tilde{y}_i}^{N_1}(n) - q_i^*(n, K) P_{x_i\tilde{x}_i}^{N_2}(n-K)}{P_{\tilde{y}_i\tilde{y}_i}^{N_3}(n) + \Delta_i}\right) \tag{41}$$

and $$q_i(n, k) = \left|\frac{P_{\tilde{y}_i x_i}^{N_4}(n, k)}{P_{x_i x_i}^{N_5}(n-k)}\right|, \tag{42}$$

where $N_1$, $N_2$, $N_3$, $N_4$ and $N_5$ are observation window sizes and $$P_{xy}^N(n, k) = \sum_{l=0}^{N-1} x(n-l) y^*(n-l-k). \tag{43}$$

Likewise if smooth averages are employed then equations (38) and (40) become $$u_i(n) = \mathcal{L}\left(\frac{\tilde{P}_{\tilde{y}_i\tilde{y}_i}^{\beta_1}(n) - q_i^*(n, K) \tilde{P}_{x_i x_i}^{\beta_2}(n-K)}{\tilde{P}_{\tilde{y}_i\tilde{y}_i}^{\beta_3}(n) + \Delta_i}\right) \tag{44}$$

and $$q_i(n, k) = \left|\frac{\tilde{P}_{\tilde{y}_i x_i}^{\beta_4}(n, k)}{\tilde{P}_{x_i x_i}^{\beta_5}(n-k)}\right| \tag{45}$$

where $\beta_1$, $\beta_2$, $\beta_3$, $\beta_4$ and $\beta_5$ are inversely proportional to observation window sizes and $$\tilde{P}_{xy}^\alpha(n,k) = (1-a)\tilde{P}_{xy}^\alpha(n-1,k) + \alpha x_i(n) y_i^*(n-k). \tag{46}$$

Equation (38) is actually an approximation of the following equation $$u_i(n) = \mathcal{L}\left(\frac{\mathcal{A}_1\{|\tilde{y}_i(n)|^2\} - \mathcal{A}_1\{|e_i(n)|^2\}}{\mathcal{A}_2\{|\tilde{y}_i(n)|^2\} + \Delta_i}\right) \tag{47}$$

Because $e_i(n)$ is not directly available and $\mathcal{A}_1\{\oplus e_i(n)^2\}$ must be estimated. The method employed here finds a K that maximizes $q_i(n, k)$ over a range of k, with the maximum value used to determine $\mathcal{A}_1\{\oplus e_i(n)^2\}$ by equation (48), $$\mathcal{A}_1\{|e_i(n)|^2\} \approx q_i^*(n,K) \mathcal{A}_1\{|x_i(n-K)|^2\}. \tag{48}$$

Often the range of k is a small number, the maximum value of $q_i(n, k)$ can be determined by brute force calculations.

Alternatively, the range selected for k can also be selected based on resources available for a brute force calculation. Therefore, evaluation of equation (37) can be thought of as first estimating $\mathcal{A}_1\{|e_i(n)|^2\}$, the average echo power, using equation (47) and then applying the function $f$.

Figure 11:
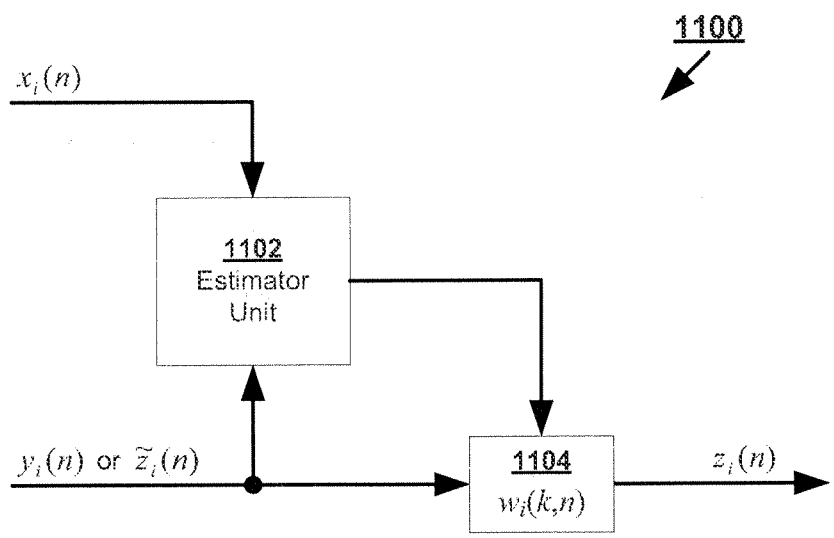
FIG. 11 shows another embodiment of a sub-band non-linear processing unit.

FIG. 11 shows another embodiment of a sub-band non-linear processing unit which can be used with systems 600, 700 and/or 800. Sub-band non-linear processing unit 1100 extends the processing beyond a simple weight into a filter, with filter coefficients $w_i(n, k)$. Estimator unit 1102 estimates these weights and filter 1104 applies them to the signal $\tilde{y}_i$, which is either $y_i$ or $\tilde{z}_i$, depending on the system used. The output signal is defined by $$z_i(n) = \sum_{k=0}^{K} \tilde{y}_i(n-k-N) w_i(n, k). \tag{49}$$

Figure 12:
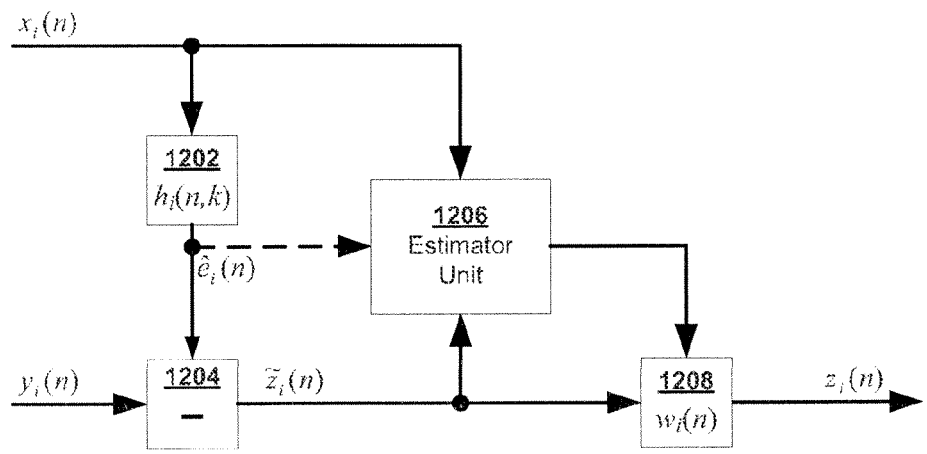
FIG. 12 shows an embodiment of one sub-band non-linear processing unit with a sub-band linear echo canceller.

FIG. 12 shows an embodiment of one sub-band of an echo canceller such as that shown in system 800. A linear echo canceller comprising echo approximator 1202 and subtractor 1204 is shown along with a non-linear processing unit, comprising estimator unit 1206 and scaler 1208. Estimator unit 1206 function similarly to estimator unit 1002 except estimator unit 1206 has synthesized echo $\hat{e}(n)$ available for use in determining the weight. Scaler 1208 applies the weight to echo cancelled signal $y_i(n)$. In this embodiment the weight is still adaptively determined by equation (37). However, the $u_i(n)$ is given by equation (50) as $$u_i(n) = \mathcal{L}\left( \frac{\mathcal{A}_1\{|\tilde{y}_i(n)|^2\} - q_i^*(n)\mathcal{A}_1\{|x_i(n)|^2\}}{\mathcal{A}_2\{|\tilde{y}_i(n)|^2\} + \Delta_i} \right), \tag{50}$$

where $\mathcal{A}_1\{|\tilde{y}_i(n)|^2\}$ and $\mathcal{A}_2\{|\tilde{y}_i(n)|^2\}$ are averages of $|\tilde{y}_i(n)|^2$ over two observation windows, while these averages can be different types of averages over different observation windows, they often chosen to be the same type of average over the same observation window. Additionally, $\mathcal{A}_1\{|x_i(n)|^2\}$ is an average value of $|x_i(n)|^2$ over another observation window which can be distinct from the observation windows for $|\tilde{y}_i(n)|^2$. In addition $q_i(n)$ is given by $$q_i(n) = \frac{|\mathcal{A}\{y_i(n)\hat{e}_i^*(n)\}|^2}{\mathcal{A}_2\{|x_i(n)|^2\}\mathcal{A}\{|\hat{e}_i(n)|^2\}}, \tag{51}$$

where $\mathcal{A}_2\{|x_i(n)|^2\}$ is an average value of $|x_i(n)|^2$ over an observation window. While typically the same type of average is used for $\mathcal{A}_1\{|x_i(n)|^2\}$ and $\mathcal{A}_2\{|x_i(n)|^2\}$, the observation window used for $\mathcal{A}_1\{|x_i(n)|^2\}$ is typically smaller than that used for $\mathcal{A}_2\{|x_i(n)|^2\}$. Additionally, $\mathcal{A}\{y_i(n)\hat{e}_i^*(n)\}$ is an average of $y_i(n)\hat{e}_i^*(n)$ and $\mathcal{A}\{|\hat{e}_i(n)|^2\}$ is an average of $|\hat{e}_i(n)|^2$ each over an observation window which can be the same or distinct from the other averages in equations (50) and (51).

When arithmetic averages are used, equations (50) and (51) become $$u_i(n) = \mathcal{L}\left( \frac{P_{\tilde{y}_i\tilde{y}_i}^{N_1}(n) - q_i^*(n) P_{x_ix_i}^{N_2}(n)}{P_{\tilde{y}_i\tilde{y}_i}^{N_3}(n) + \Delta_i} \right), \tag{52}$$

and $$q_i(n) \frac{|P_{y_i\hat{e}_i}^{N_4}(n)|^2}{P_{x_ix_i}^{N_5}(n) P_{\hat{e}_i\hat{e}_i}^{N_6}(n)}, \tag{53}$$

where $N_1$, $N_2$, $N_3$, $N_4$, $N_5$ and $N_6$ are observation window sizes.

Like equation Likewise if smooth averages are employed then equations (50) and (51) become $$u_i(n) = \mathcal{L}\left( \frac{\tilde{P}_{\tilde{y}_i\tilde{y}_i}^{\beta_1}(n) - q_i^*(n)\tilde{P}_{x_ix_i}^{\beta_2}(n)}{\tilde{P}_{\tilde{y}_i\tilde{y}_i}^{\beta_3}(n) + \Delta_i} \right), \tag{54}$$

and $$q_i(n) \frac{|\tilde{P}_{y_i\hat{e}_i}^{\beta_4}(n)|^2}{\tilde{P}_{x_ix_i}^{\beta_5}(n) \tilde{P}_{\hat{e}_i\hat{e}_i}^{\beta_6}(n)}, \tag{55}$$

where $\beta_1$, $\beta_2$, $\beta_3$, $\beta_4$, $\beta_5$ and $\beta_6$ are inversely proportional to observation window sizes.

Equation (50) is also an approximation. In particular it is an approximation of $$u_i(n) = \mathcal{L}\left( \frac{\mathcal{A}_1\{|\tilde{y}_i(n)|^2\} - \mathcal{A}\{|\epsilon_i(n)|^2\}}{\mathcal{A}_2\{|\tilde{y}_i(n)|^2\} + \Delta_i} \right) \tag{56}$$

where $\mathcal{A}_1\{|\epsilon_i(n)|^2\}$ is the average power of the residual echo over an observation window. By using the following approximation, $$\mathcal{A}\{|\epsilon_i(n)|^2\} \approx q_i^*(n) \mathcal{A}_1\{|x_i(n)|^2\}, \tag{57}$$

Equation (50) is derived. Once again the process of determining the weight can be thought of as first approximating the average power of the residual echo, then using equation (56), and the applying the function $f$.

It should be noted that the mathematical basis for approximations (48) and (57) rely on the simplifying assumption that within a particular sub-band, the signals have the white noise property, that is their frequency response is essentially flat. While this is not true for a signal across all frequencies, if the sub-bands are selected sufficiently narrow, each signal will approximately exhibit the white noise property. Some cross-correlation terms which make estimating these quantities difficult in the context of a particular sub-band can be assumed to be zero simplifying the estimates of the echo and residual echo.

Because within a sub-band, it is possible to now estimate the echo power, and residual echo power, quantities which could not be easily estimated for a full time domain signal, additionally other averages based on the residual echo or echo such as $P_{z_i\epsilon_i}^N(n)$ or more generically $\mathcal{A}\{|z_i(n)\epsilon_i^*(n)|^2\}$ can also be estimated in each sub-band more readily which can then be supplied to any attached linear echo canceller.

Figure 13:
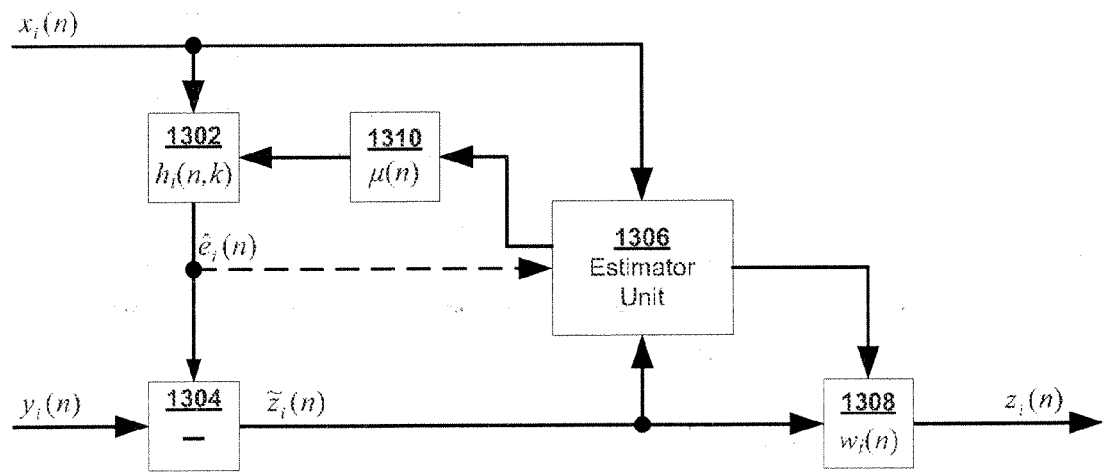
FIG. 13 shows another embodiment of one sub-band non-linear processing unit with a sub-band linear echo canceller.

FIG. 13 shows another embodiment of one sub-band of an echo canceller such as that shown in system 800. A linear echo canceller comprising echo approximator 1302, subtractor 1304 and adaptation coefficient generator 1310 is shown along with a non-linear processing unit, comprising estimator unit 1306 and scaler 1308. Estimator unit 1306 function similarly to estimator unit 1206 except estimator unit 1306 can provide information to echo approximator 1302, for example, it can supply an approximation to $P_{\tilde{z}_i\epsilon_i}^N$ or $\mathcal{A}\{|\hat{z}_i(n)\epsilon_i^*(n)|^2\}$ to adaptation coefficient generator 1310 which can be used to adjust the adaptation coefficient for echo estimator 1302.

As with the specific implementation of echo canceller 400 and 500, the various components of echo cancellation/suppression systems 600, 700, 800, and 900 including any comfort noise insertion module, central clipping module, scalars and/or estimator units, can be implemented in hardware or as software or firmware instructions to be executed by a processor such as a DSP. It can also be a combination of software or firmware and specialized circuitry.

Figure 14:
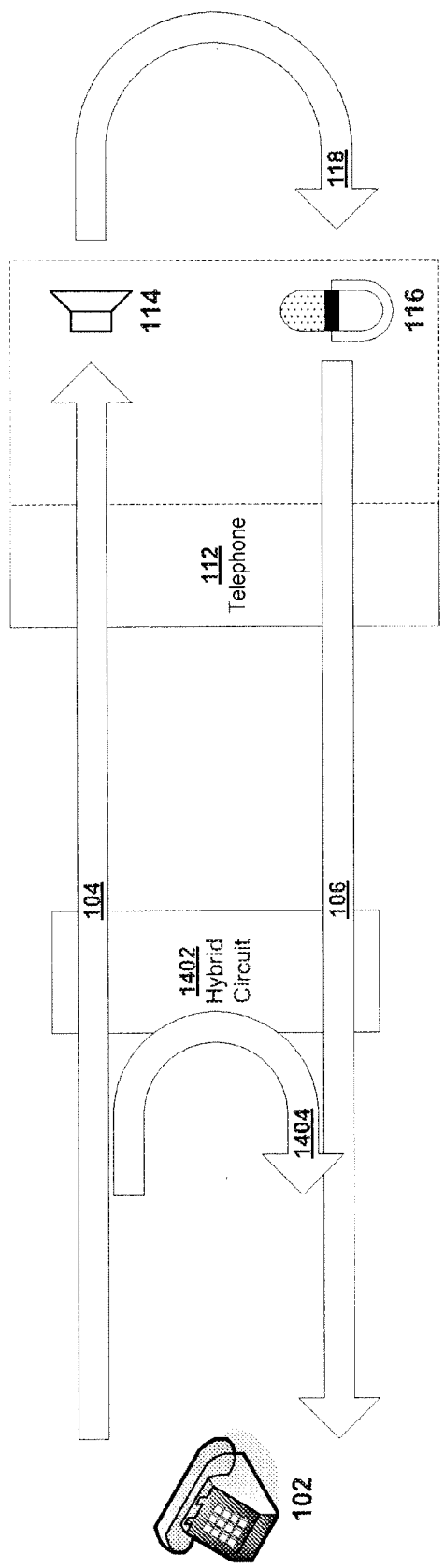
FIG. 14 shows a telephonic communications system including a hybrid circuit.

FIG. 14 shows a telephonic communications system including a hybrid circuit. In telephony, echoes can also be produced by a hybrid circuit. During a call between telephone 102 and telephone 112, telephone 102 transmits signal 104 and receives signal 106. The signals 104 and 106 pass through at least one hybrid circuit 1402 which is part of the telephone network. The hybrid circuit 1402 reflects back a version of signal 104 into signal 106, which is shown as hybrid echo 1404. The existence of multiple sources of echo gives rise to several alternative implementations of the echo cancellation and suppression systems described above. While the echo cancellation/suppression is illustrated in a telephonic communications system, where the echo cancellation system is incorporated to telephone to address acoustic echo, the same systems described above can be employed to address electronic hybrid echo or can address both types of echo.

FIG. 15 shows a telephonic communications system where an echo canceller built into or attached to the hybrid circuit. Echo canceller 1502 is designed to remove the hybrid echo caused by hybrid circuit 108. The advantage and disadvantage of this approach is that the echo canceller addresses only the echo caused by hybrid circuit 108. Because one type of echo is addressed, it is simpler, but it also leaves acoustic echo 118.

FIG. 16 shows a telephonic communications system where an echo canceller is built into a telephone. In this example, from the perspective of telephone 1602, the signal 104 is the near-end signal and signal 106 is the far-end signal. Unlike telephone 102, echo canceller 1604 in telephone 1602 cancels acoustic echo caused by telephone 112. It may also cancel the hybrid echo. In fact, a single telephone can employ an "inbound" echo canceller as shown here and an "outbound" echo canceller, where the inbound echo canceller addresses the echo caused by the remote telephone and/or hybrid circuits, and the outbound echo canceller addresses the local acoustic echo.

It should be emphasized that the above-described embodiments are merely examples of possible implementations. Many variations and modifications may be made to the above-described embodiments without departing from the principles of the present disclosure. For example, while this disclosure is expressed in terms of a telephonic communications system, the echo cancellation and suppression system disclosed herein can apply to any two-way communications systems and particularly any which exhibits acoustic echo, especially devices that have both a microphone with a nearby speaker. As an example, it can apply to communications software or systems employed in a personal computer to drive a VoIP system. All such modifications and variations are intended to be included herein within the scope of this disclosure and protected by the following claims.

What is claimed:

1. A method of cancelling an echo comprising: approximating the echo by applying a transfer function to a far-end signal to generate an approximate echo, said transfer function having an impulse response and an order; adapting the transfer function by modifying the impulse response based on an adaptation coefficient, by dividing a value generated by an estimator function by a sum of a total energy of the far-end signal over a first observation window and a predetermined constant number; and wherein the estimator function generates a value on the basis of the received signal, an output signal from an echo canceller, the far-end signal and/or the approximate echo.

2. The method of claim 1 wherein the output signal is generated by subtracting the approximate echo from a received signal.

3. The method of claim 2 wherein the received signal comprises a near-end signal.

4. The method of claim 2 wherein the received signal comprises the echo.

5. The method of claim 1 where the total energy is calculated as an average of $|x(n)|^2$ over the first observation window times the order of the transfer function.

6. The method of claim 5, wherein the average is an arithmetic average or a smooth average.

7. The method of claim 5, wherein the first observation window has a size equal to the order of the transfer function.

8. The method of claim 5, wherein x(n) is the far-end signal and n is a sampling time index.

9. The method of claim 1 further comprising: synthesizing a synthetic echo; and adding the synthetic echo to the received signal.

10. A system with echo cancellation comprising: an echo approximator configured to apply a transfer function, having an impulse response and an order, to a far-end signal and produce an approximate echo; a subtractor configured to subtract the approximate echo from a received signal comprising a near-end signal and an echo of the far-end signal to produce an output signal; an adaption coefficient generator configured to generate an adaptation coefficient, by dividing a value generated by an estimator by a sum of a total energy of the far-end signal over a first observation window and a predetermined constant number; wherein the impulse response of the transfer function is modified based on the adaptation coefficient.

11. The system of claim 10 wherein the estimator function is configured to generate a value on the basis of the received signal, the output signal, the far-end signal and/or the approximate echo.

12. The system of claim 10 further comprising an echo synthesizer configured to generate a synthetic echo from the far-end signal.

13. The echo cancellation system of claim 12 further comprising an adder configured to add the synthetic echo to the received signal.

* * * * *